US009345055B2

(12) United States Patent  (10) Patent No.: US 9,345,055 B2
Cho et al.  (45) Date of Patent: May 17, 2016

(54) METHOD AND APPARATUS FOR ESTABLISHING DEVICE-TO-DEVICE CONNECTION IN WIRELESS COMMUNICATION SYSTEM

(71) Applicant: LG ELECTRONICS INC., Seoul (KR)

(72) Inventors: Heejeong Cho, Anyang-si (KR); Eunjong Lee, Anyang-si (KR); Jaehoon Chung, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/395,798

(22) PCT Filed: Apr. 11, 2013

(86) PCT No.: PCT/KR2013/003026
§ 371 (c)(1),
(2) Date: Oct. 20, 2014

(87) PCT Pub. No.: WO2013/162193
PCT Pub. Date: Oct. 31, 2013

(65) Prior Publication Data
US 2015/0080002 A1  Mar. 19, 2015

Related U.S. Application Data

(60) Provisional application No. 61/639,095, filed on Apr. 27, 2012.

(51) Int. Cl.
*H04W 76/02* (2009.01)
*H04W 8/00* (2009.01)
*H04W 48/12* (2009.01)

(52) U.S. Cl.
CPC ............ *H04W 76/023* (2013.01); *H04W 8/005* (2013.01); *H04W 76/021* (2013.01); *H04W 48/12* (2013.01)

(58) Field of Classification Search
CPC . H04W 8/005; H04W 76/021; H04W 76/023; H04W 4/005; H04W 28/0215
USPC ............. 455/450, 456.1, 456.2, 452.1, 452.2; 370/329
See application file for complete search history.

(56) References Cited

U.S. PATENT DOCUMENTS

2011/0106837 A1 * 5/2011 Walton .................. H04W 48/16
707/769
2011/0312331 A1  12/2011 Hakola et al.
(Continued)

FOREIGN PATENT DOCUMENTS

| KR | 10-2009-0005647 | 1/2009 |
| WO | 2010/049801 | 5/2010 |
| WO | 2011/131666 | 10/2011 |

OTHER PUBLICATIONS

PCT/SE2011/050772, filed on Jun. 17, 2011 and published in English.*

(Continued)

*Primary Examiner* — Siu Lee
(74) *Attorney, Agent, or Firm* — Lee, Hong, Degerman, Kang & Walmey; Jonathan Kang; Michael Monaco

(57) ABSTRACT

A method and apparatus for establishing, by a first device, a device-to-device (D2D) connection with a second device in a wireless communication system is provided. When the D2D connection is initiated by a network, the first device receives a D2D broadcast configuration message including information on the second device, from the network, and determines whether to establish the D2D connection with the second device or not. Or, when the D2D connection is initiated by the first device, the first device determines whether to establish the D2D connection with the second device or not, based on at least one of a proximity between the first device and the second device based on a profile of the second device obtained through a neighbor discovery procedure.

14 Claims, 10 Drawing Sheets

(56) References Cited

U.S. PATENT DOCUMENTS

| | | | |
|---|---|---|---|
| 2011/0317569 A1* | 12/2011 | Kneckt | H04W 74/0833 370/252 |
| 2012/0142268 A1* | 6/2012 | Tao | H04W 4/08 455/3.05 |
| 2013/0244669 A1* | 9/2013 | Das | H04W 24/02 455/446 |
| 2014/0122607 A1* | 5/2014 | Fodor | H04W 4/005 709/204 |
| 2014/0153390 A1* | 6/2014 | Ishii | H04W 76/023 370/230 |
| 2015/0045078 A1* | 2/2015 | Lee | H04W 76/021 455/509 |
| 2015/0117293 A1* | 4/2015 | Cho | H04W 76/002 370/312 |

OTHER PUBLICATIONS

PCT International Application No. PCT/KR2013/003026, Written Opinion of the International Searching Authority dated Jul. 26, 2013, 1 page.

* cited by examiner

METHOD AND APPARATUS FOR ESTABLISHING DEVICE-TO-DEVICE CONNECTION IN WIRELESS COMMUNICATION SYSTEM

CROSS-REFERENCE TO RELATED APPLICATIONS

This application is the National Stage filing under 35 U.S.C. 371 of International Application No. PCT/KR2013/003026, filed on Apr. 11, 2013, which claims the benefit of U.S. Provisional Application Ser. No. 61/639,095, filed on Apr. 27, 2012, the contents of which are all hereby incorporated by reference herein in their entirety.

BACKGROUND OF THE INVENTION

1. Field of the Invention

The present invention relates to wireless communications, and more particularly, to a method and apparatus for establishing a device-to-device (D2D) connection in a wireless communication system.

2. Related Art

In next generation multimedia mobile communication systems, which have been actively studied in recent years, there is a demand for a system capable of processing and transmitting a variety of information (e.g., video and radio data) in addition to the early-stage voice service. Further, a 3rd generation wireless communication system is followed by a 4th generation wireless communication which is currently being developed aiming at supporting a high-speed data service of 1 gigabits per second (Gbps) in downlink and 500 megabits per second (Mbps) in uplink. The wireless communication system is designed for the purpose of providing reliable communication to a plurality of users irrespective of their locations and mobility. However, a wireless channel has an abnormal characteristic such as a fading phenomenon caused by a path loss, noise, and multipath, an inter-symbol interference (ISI), a Doppler effect caused by mobility of a user equipment, etc. Therefore, various techniques have been developed to overcome the abnormal characteristic of the wireless channel and to increase reliability of wireless communication.

Meanwhile, with the advent of a ubiquitous environment, there is a rapid increase in a demand for receiving a seamless service anytime anywhere by using equipments. In order to satisfy such a demand, a device-to-device (D2D) connection technique may be introduced in a wireless communication system. The D2D connection technique refers to a technique for transmitting and receiving data not via a base station (BS) since devices such as a user equipment (UE) or the like are connected to each other. That is, one device can communicate with another device via the BS, and can directly communicate with another device not via the BS. By using the D2D connection technique, such an effect as low power consumption, throughput enhancement, etc., can be obtained.

Various scenarios may exist to establish the D2D connection. There may be a D2D connection scenario on the basis of whether the D2D connection establishment is initiated by the BS or each device. In addition, there may be a D2D connection scenario on the basis of whether information regarding another device neighboring to a specific device is known to the BS and/or the specific device.

A method for effectively establishing a D2D connection is required when information on neighbor devices of a specific device is known to both a network and the specific device.

SUMMARY OF THE INVENTION

The present invention provides a method and apparatus for establishing a device to device (D2D) connection in a wireless communication system. The present invention provides various scenarios for establishing a D2D connection when information on neighbor devices of a specific device is known to both a network and the specific device.

In an aspect, a method for establishing, by a first device, a device-to-device (D2D) connection with a second device in a wireless communication system is provided. The method includes receiving a D2D broadcast configuration message including information on the second device, from a network, determining whether to establish the D2D connection with the second device or not, based on at least one of a proximity between the first device and the second device, a presence of data to be transmitted between the first device and the second device, and a preference for the D2D connection of the first device, and transmitting a connection establishment setup report message including information on the second device to the network, if it is determined to establish the D2D connection with the second device.

In another aspect, a method for establishing, by a first device, a device-to-device (D2D) connection with a second device in a wireless communication system is provided. The method includes determining whether to establish the D2D connection with the second device or not, based on at least one of a proximity between the first device and the second device based on a profile of the second device obtained through a neighbor discovery procedure, a presence of data to be transmitted to the second device, and a preference for the D2D connection of the first device, transmitting a connection establishment request message to request of the D2D connection establishment to a network if it is determined to establish the D2D connection with the second device, the connection establishment request message including information on the second device and a quality of service (QoS) parameter for the D2D connection, and receiving a connection establishment response message indicating whether the request of the D2D connection establishment is accepted or rejected, from the network.

A D2D connection is efficiently established.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

Figure 1:
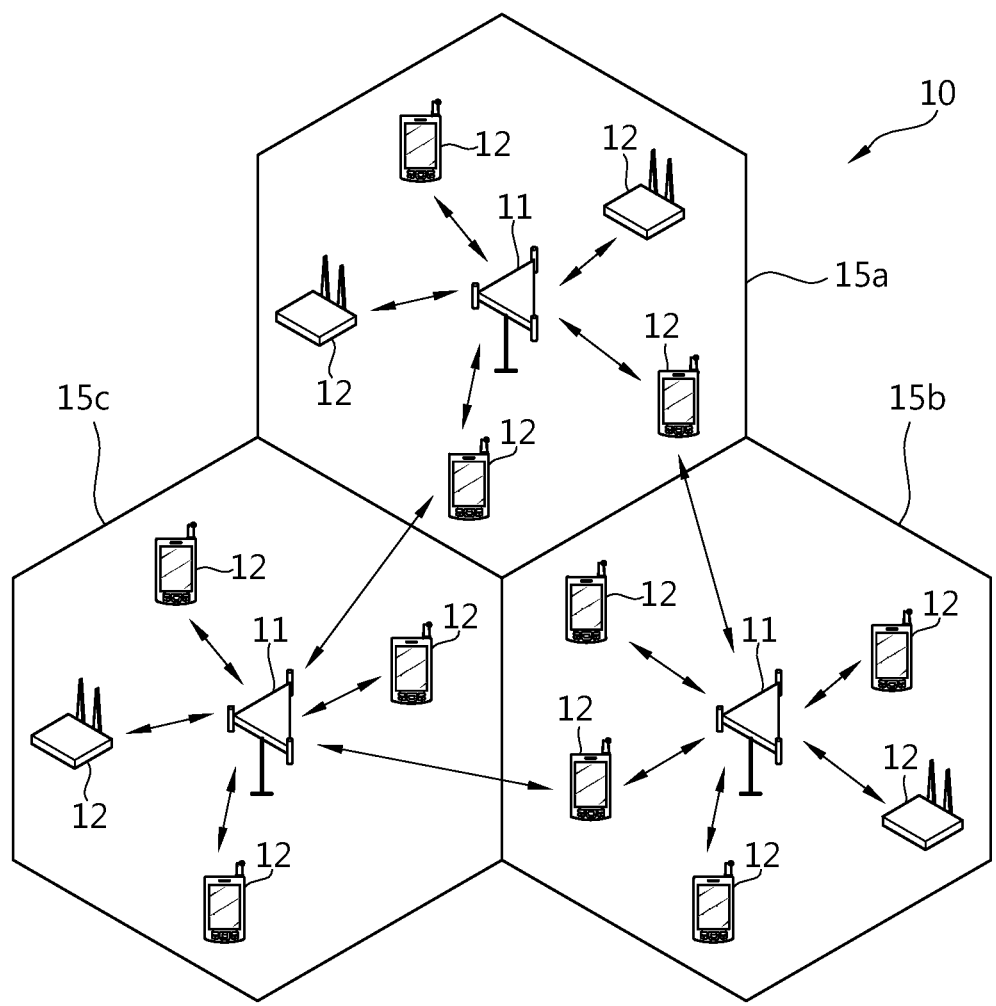
FIG. 1 shows a wireless communication system.

FIG. 1 shows a wireless communication system.

The wireless communication system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as MS (mobile station), MT (mobile terminal), UT (user terminal), SS (subscriber station), wireless device, PDA (personal digital assistant), wireless modem, handheld device. The BS 11 generally refers to a fixed station that communicates with the UE 12 and may be called by other names such as eNB (evolved-NodeB), BTS (base transceiver system), access point (AP), etc.

In general, a UE belongs to one cell, and the cell to which a UE belongs is called a serving cell. A BS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technique can be used for downlink or uplink. In general, downlink refers to communication from the BS 11 to the UE 12, and uplink refers to communication from the UE 12 to the BS 11. In downlink, a transmitter may be part of the BS 11 and a receiver may be part of the UE 12. In uplink, a transmitter may be part of the UE 12 and a receiver may be part of the BS 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

A device-to-device (D2D) connection technique can be employed in a wireless communication system. The D2D connection technique refers to a technique for transmitting and receiving data not via a BS since devices such as a user equipment (UE) or the like are connected to each other. There may be various scenarios for establishing the D2D connection.

Figure 2:
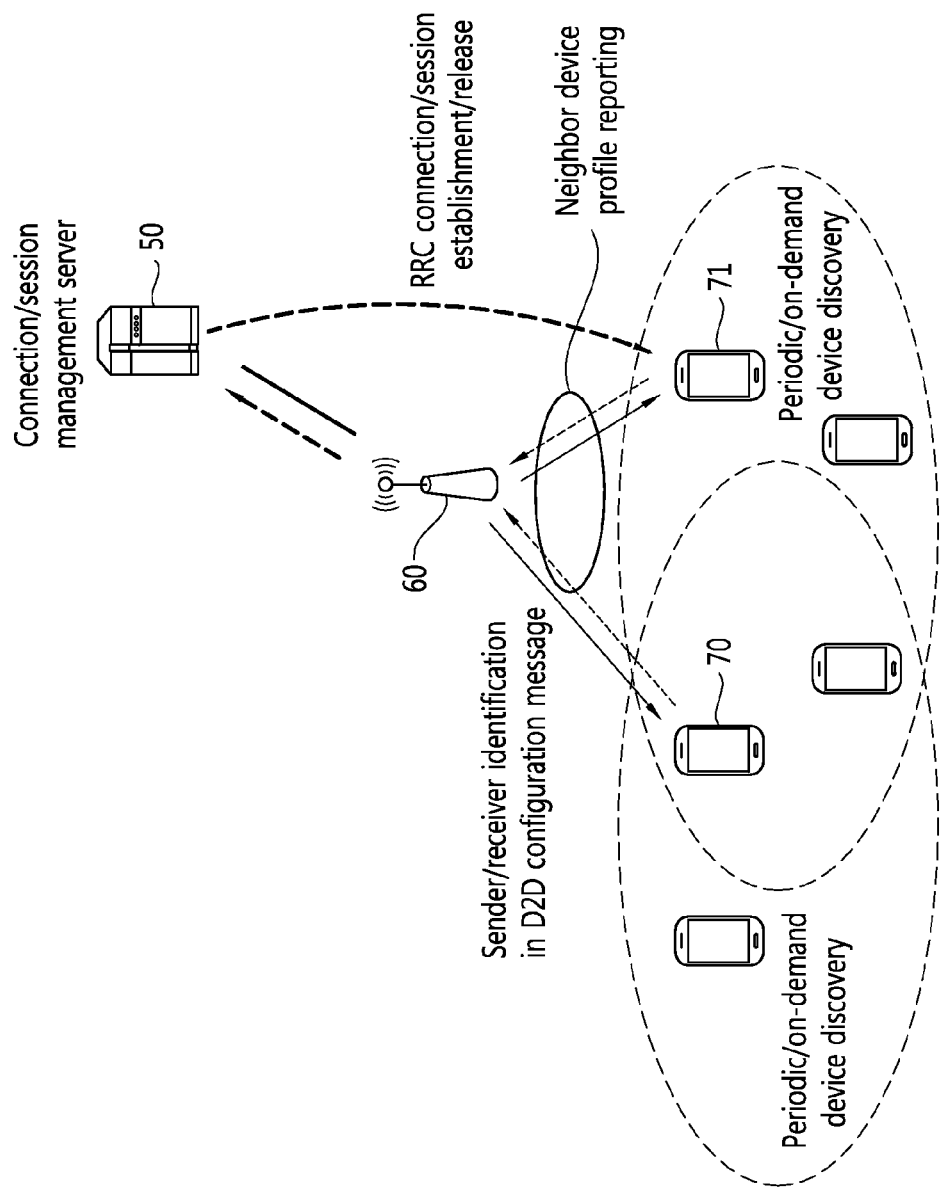
FIG. 2 shows an example of a D2D connection scenario according to an embodiment of the present invention.

FIG. 2 shows an example of a D2D connection scenario according to an embodiment of the present invention.

It is assumed in FIG. 2 that information on neighbor devices of a specific device is known to both a network and the specific device. In such a scenario, a D2D connection establishment can be initiated by both the network and the specific device. Upon receiving an uplink (UL) packet transmitted from each device, the network can perform a D2D connection establishment procedure. The network can use each device's location and routing information or use neighbor devices' profiles reported by each device to determine a proximity between the devices. Alternatively, each device can use information regarding neighbor devices and reported by the network or use a neighbor discovery procedure to determine the proximity between the devices.

Referring to FIG. 2, each of devices 70 and 71 can perform the neighbor discovery procedure either periodically or on demand of a base station (BS). Each of the devices 70 and 71 can report neighbor devices' profiles acquired through the neighbor discovery procedure to a BS 60. In addition, when each of the devices 70 and 71 reports the neighbor devices' profiles to the BS 60, each of the devices 70 and 71 additionally can perform sounding or report channel state information (CSI) periodically.

The BS 60 transmits a D2D configuration message to each of the devices 70 and 71 to establish the D2D connection. In this case, the D2D configuration message may include an identifier of each of the devices 70 and 71. If the D2D connection is established, the BS 60 reports this to a connection/session management server 50, and the connection/session management server 50 instructs each of the devices 70 and 71 to establish/release a radio resource control (RRC) connection/session.

After the D2D connection establishment is complete, each of the devices 70 and 71 can transmit and receive data directly, not via the BS 60. In this case, a D2D resource used by each of the devices 70 and 71 to directly transmit and receive the data may be independent of or shared with an existing base station to device (B2D) resource for data transmission and reception between each of the devices 70 and 71 and the BS 60.

Hereinafter, a D2D connection establishment method will be described according to an embodiment of the present invention. First, a case in which a D2D connection establishment procedure is initiated by a BS will be explained.

When the BS initiates the D2D connection establishment, the BS can request each device to establish the D2D connection by determining a proximity between devices by the use of location information of the devices, a presence of data to be transmitted and received between the devices, a preference for a D2D connection of each of the devices, etc. The network and the device can pre-negotiate about whether a D2D connection is preferred or a B2D connection is preferred according to an application type or a data characteristic. Upon receiving a D2D connection establishment request, the device can determine whether to accept the request by using neighbor devices' profiles acquired through a neighbor discovery procedure.

Figure 3:
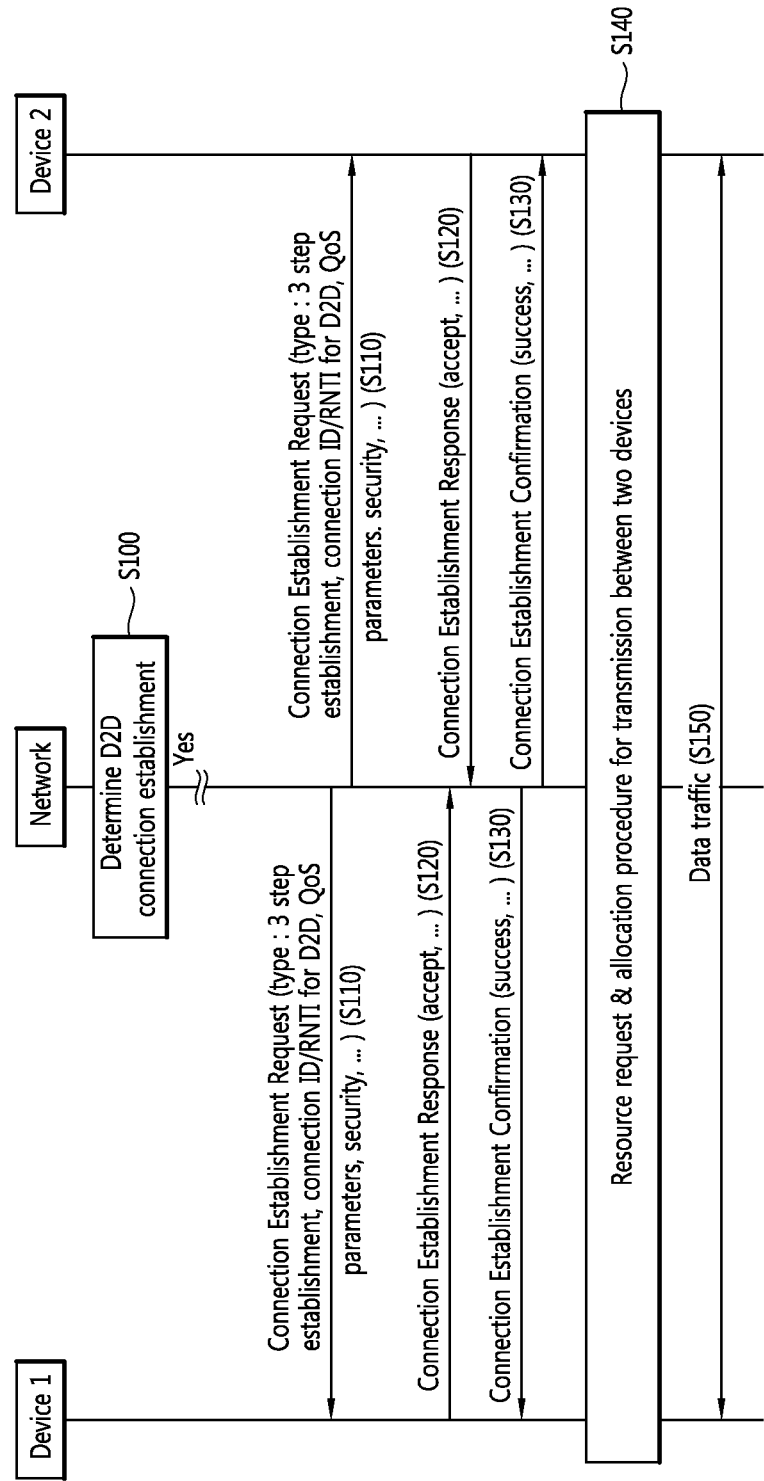
FIG. 3 shows an example of a D2D connection establishment method according to an embodiment of the present invention.

FIG. 3 shows an example of a D2D connection establishment method according to an embodiment of the present invention. The embodiment of FIG. 3 shows a case in which, when a D2D connection establishment is initiated by a network, the D2D connection establishment procedure is achieved in three steps, and a message for the D2D connection establishment is transmitted in a unicast manner to devices to which the D2D connection establishment is targeted.

Referring to FIG. 3, the network determines whether a D2D connection is established between a device 1 and a device 2 in step S100. The network may determine a proximity between the devices 1 and 2 by the use of location information of the devices 1 and 2, a presence of data to be transmitted between the devices 1 and 2, a preference for a D2D connection of each of the devices 1 and 2, etc.

If the network determines to establish the D2D connection between the device 1 and the device 2, the network transmits a connection establishment request message to the devices 1 and 2 in a unicast manner in step S110. The connection establishment request message may include a connection establishment type, information of each device, a quality of service (QoS) parameter for the D2D connection, security information, a D2D identifier, etc. The connection establishment type indicates a 3-step D2D connection establishment procedure. The information of each device indicates information of devices to which the D2D connection establishment is targeted. The information of each device may be any one of each device's cell radio network temporary identifier (C-RNTI), a station identifier (STID), etc assigned by the network.

The D2D identifier indicates an identifier of the D2D connection to be established between the device 1 and the device 2 by the network. The D2D identifier may be a link level D2D identifier. The link level D2D identifier is an identifier assigned to a connection for recognizing each UE, and is an identifier assigned to a physical connection between the devices. Only one logical link may exist between the devices. Therefore, the link level D2D identifier may be unique in a specific area. In IEEE 802.16, the link level D2D identifier may be an STID. In 3GPP LTE-A, the link level D2D identifier may be an RNTI. Alternatively, the D2D identifier may be a connection/flow level D2D identifier. The connection/flow level D2D identifier is an identifier assigned to one or more service flows that can be established between the devices, and is an identifier assigned to a logical connection between the devices. A plurality of connections or flows each of which has a different property may exist between the devices. In IEEE 802.16, the connection/flow level D2D identifier may be a flow ID or connection ID in a media access control (MAC) layer. In 3GPP LTE-A, the connection/flow level D2D identifier may be a logical channel ID (LCID) in an MAC layer or a distributed resource block (DRB) identity in a radio link control (RLC) layer. Meanwhile, the D2D identifier may also be used in resource allocation for data transmission and reception after the D2D connection establishment is complete.

In step S120, the devices 1 and 2 transmit a connection establishment response message to the network. The connection establishment response message indicates whether to accept or deny a D2D connection establishment request of the network. The embodiment of FIG. 3 shows a case in which the devices 1 and 2 accept the D2D connection establishment request of the network.

In step S130, the network transmits a connection establishment confirm message to the devices 1 and 2. The connection establishment confirm message indicates whether the D2D connection establishment finally succeeds according to the acceptance/denial of the D2D connection establishment request of the devices 1 and 2. In the embodiment of FIG. 3, since the devices 1 and 2 accept the D2D connection establishment request, the connection establishment confirm message indicates a success of the D2D connection establishment. The connection establishment confirm message may be transmitted to each of the devices 1 and 2 in a unicast manner, or may be transmitted to the devices 1 and 2 in a multicast manner by using the D2D identifier transmitted through the connection establishment request message.

In step S140, the devices 1 and 2 perform a resource request and allocation procedure for data transmission. The D2D identifier transmitted through the connection establishment request message may be used in resource allocation. If the resource allocation is complete between the device 1 and the device 2, the devices 1 and 2 transmit and receive traffic data in step S150.

Figure 4:
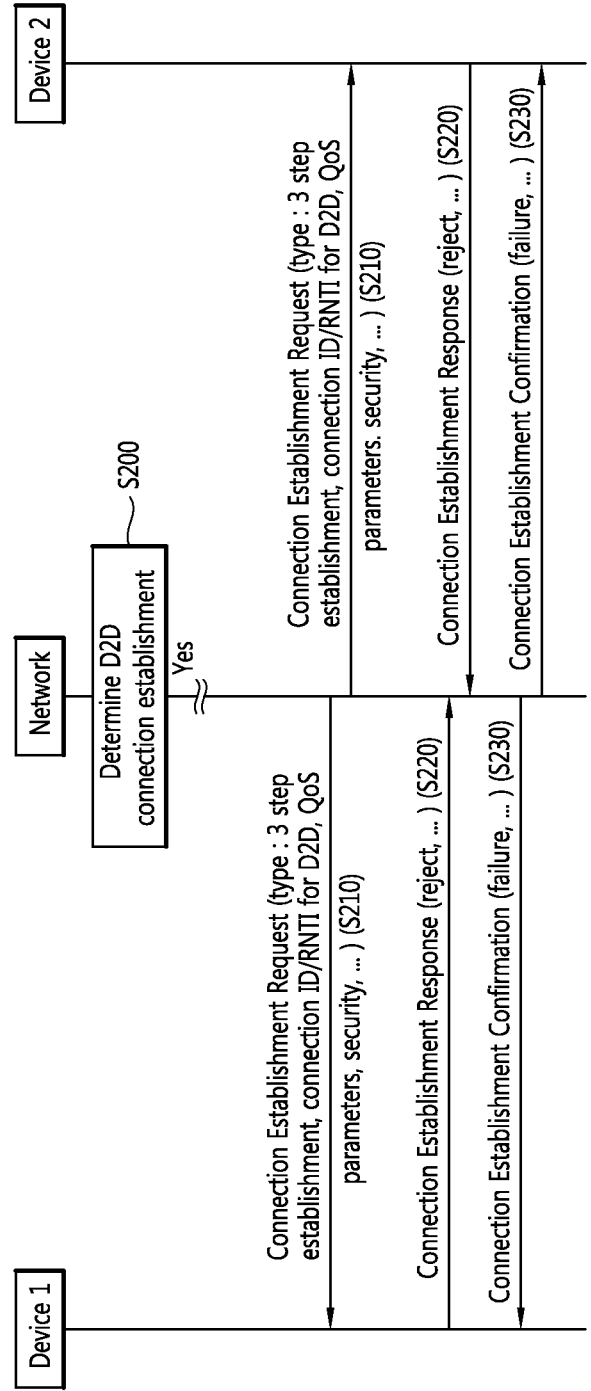
FIG. 4 shows another example of a D2D connection establishment method according to an embodiment of the present invention.

FIG. 4 shows another example of a D2D connection establishment method according to an embodiment of the present invention. The embodiment of FIG. 4 shows a case in which, when a D2D connection establishment is initiated by a network, the D2D connection establishment procedure is achieved in three steps, and a message for the D2D connection establishment is transmitted in a unicast manner to devices to which the D2D connection establishment is targeted.

Referring to FIG. 4, the network determines whether a D2D connection is established between a device 1 and a device 2 in step S200. If the network determines to establish the D2D connection between the device 1 and the device 2, the network transmits a connection establishment request message to the devices 1 and 2 in a unicast manner in step S210. The connection establishment request message may include a connection establishment type, information of each device, a QoS parameter for the D2D connection, security information, a D2D identifier, etc.

In step S220, the devices 1 and 2 transmit a connection establishment response message to the network. The connection establishment response message indicates whether to accept or deny a D2D connection establishment request of the network. The embodiment of FIG. 4 shows a case in which the devices 1 and 2 deny the D2D connection establishment request of the network.

In step S230, the network transmits a connection establishment confirm message to the devices 1 and 2. The connection establishment confirm message indicates whether the D2D connection establishment finally succeeds according to the acceptance/denial of the D2D connection establishment request of the devices 1 and 2. In the embodiment of FIG. 4, since the devices 1 and 2 deny the D2D connection establishment request, the connection establishment confirm message indicates a failure of the D2D connection establishment. The connection establishment confirm message may be transmitted to each of the devices 1 and 2 in a unicast manner, or may be transmitted to the devices 1 and 2 in a multicast manner by using the D2D identifier transmitted through the connection establishment request message.

Figure 5:
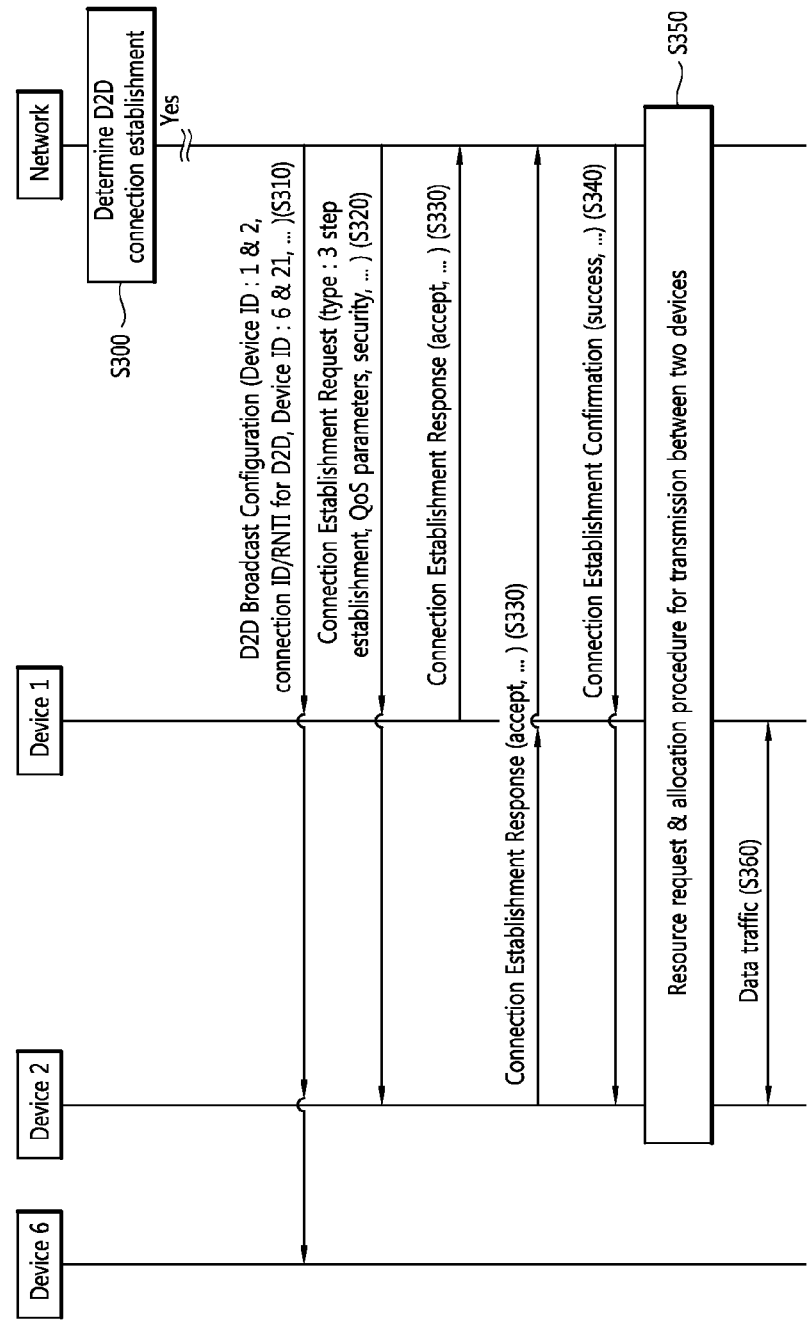
FIG. 5 shows another example of a D2D connection establishment method according to an embodiment of the present invention.

FIG. 5 shows another example of a D2D connection establishment method according to an embodiment of the present invention. The embodiment of FIG. 5 shows a case in which, when a D2D connection establishment is initiated by a network, the D2D connection establishment procedure is achieved in three steps, and a message for the D2D connection establishment is transmitted in a broadcast or multicast manner to devices to which the D2D connection establishment is targeted.

Referring to FIG. 5, the network determines whether a D2D connection is established between devices in step S300. The network can determine whether the D2D connection is established between the devices on the basis of a proximity between the devices by the use of location information of the devices, a presence of data to be transmitted and received between the devices, a preference for the D2D connection of the devices, etc.

In step S310, the network transmits a D2D broadcast configuration message. The D2D broadcast configuration message may be transmitted in a broadcast manner. That is, the D2D broadcast configuration message can be transmitted not only to devices which are considered by the network as devices to which the D2D connection establishment is targeted but also to all neighbor devices. The D2D broadcast configuration message may include information of each device, a D2D identifier, etc. The information of each device indicates information of devices to which the D2D connection establishment is targeted. The information of each device may be any one of each device's C-RNTI, an STID, etc assigned by the network. The D2D identifier indicates an identifier for the D2D connection to be established by the network. The D2D identifier may be a link level D2D identifier. In IEEE 802.16, the link level D2D identifier may be an STID. In 3GPP LTE-A, the link level D2D identifier may be an RNTI. Alternatively, the D2D identifier may be a connection/flow level D2D identifier. In IEEE 802.16, the connection/flow level D2D identifier may be a flow ID or connection ID in an MAC layer. In 3GPP LTE-A, the connection/flow level D2D identifier may be an LCID in an MAC layer or a DRB identity in an RLC layer.

In step S320, the network transmits a connection establishment request message to the devices 1 and 2. The connection establishment request message may include a connection establishment type, a QoS parameter for the D2D connection, security information, etc. The connection establishment type indicates a 3-step D2D connection establishment procedure. The connection establishment request message may be transmitted to the devices 1 and 2 in a multicast manner by using the D2D identifier transmitted through the D2D broadcast configuration message.

In step S330, the devices 1 and 2 transmit a connection establishment response message to the network. The connection establishment response message indicates whether to accept or deny a D2D connection establishment request of the network. The embodiment of FIG. 5 shows a case in which the devices 1 and 2 accept the D2D connection establishment request of the network.

In step S340, the network transmits a connection establishment confirm message to the devices 1 and 2. The connection establishment confirm message indicates whether the D2D connection establishment finally succeeds according to the acceptance/denial of the D2D connection establishment request of the devices 1 and 2. In the embodiment of FIG. 5, since the devices 1 and 2 accept the D2D connection establishment request, the connection establishment confirm message indicates a success of the D2D connection establishment. The connection establishment confirm message can be transmitted to the devices 1 and 2 in a multicast manner by using the D2D identifier transmitted through the D2D broadcast configuration message.

In step S350, the devices 1 and 2 perform a resource request and allocation procedure for data transmission. The D2D identifier transmitted through the D2D broadcast configuration message may be used in resource allocation. If the resource allocation is complete between the device 1 and the device 2, the devices 1 and 2 transmit and receive traffic data in step S360.

Figure 6:
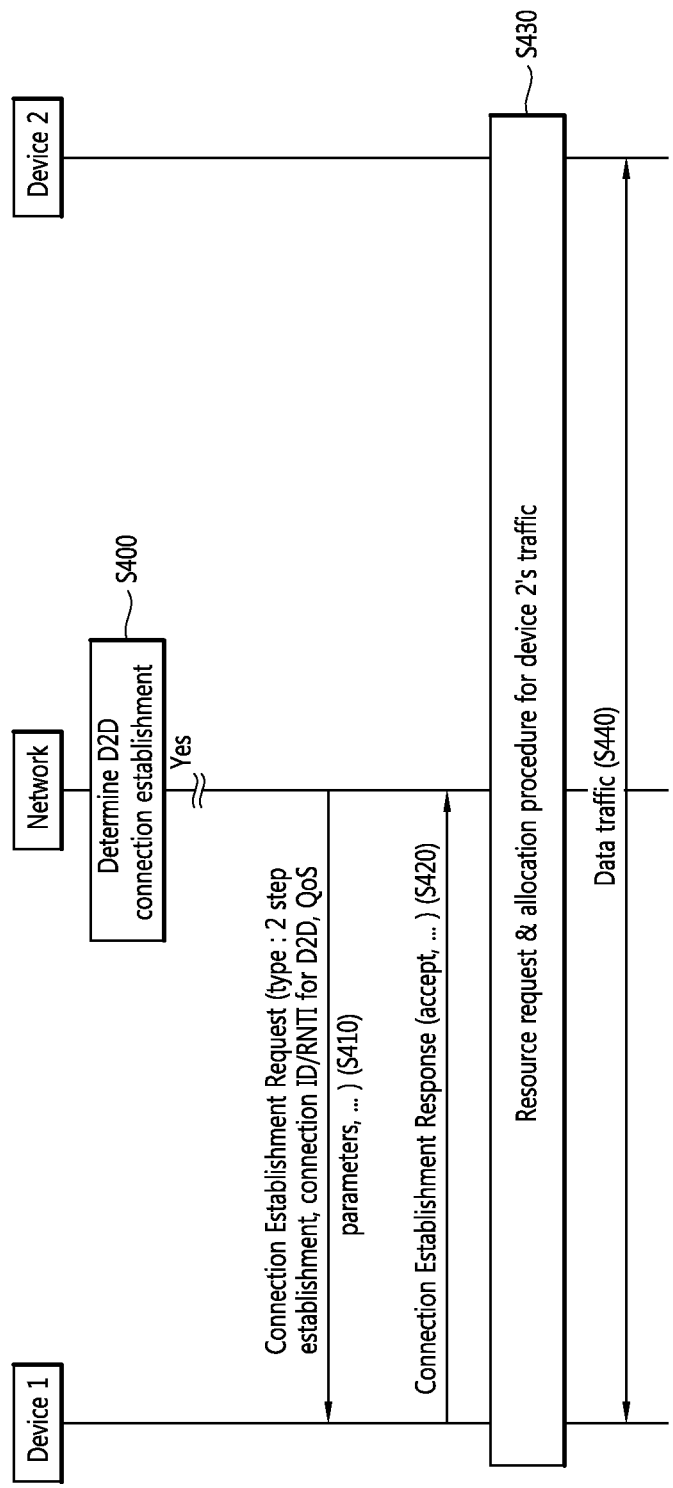
FIG. 6 shows another example of a D2D connection establishment method according to an embodiment of the present invention.

FIG. 6 shows another example of a D2D connection establishment method according to an embodiment of the present invention.

The embodiment of FIG. 6 shows a case in which, when a D2D connection establishment is initiated by a network, the D2D connection establishment procedure is achieved in two steps. A D2D connection can be established between a device 1 and a device 2 in a state where the device 2 has already transmitted data to many random devices in a neighbor area. The device 2 may be a device used in a business (e.g., a shop, a restaurant, etc.). The device 2 is in a state in which a D2D connection has already been established to the many random devices. In this case, the D2D connection can be established when the device 1 accepts a D2D connection establishment request of the network. That is, since a connection establishment confirm procedure is not required, the D2D connection establishment procedure can be performed in two steps.

Referring to FIG. 6, the network determines whether the D2D connection is established between the device 1 and the device 2 in step S400. The network may determine a proximity between the devices 1 and 2 by the use of location information of the devices 1 and 2, a presence of data to be transmitted between the devices 1 and 2, a preference for a D2D connection of each of the devices 1 and 2, etc.

If the network determines to establish the D2D connection between the device 1 and the device 2, the network transmits a connection establishment request message to the device 1 in step S410. The connection establishment request message may include a connection establishment type, information of each device, information on a D2D connection pre-established for traffic of the device 2, a QoS parameter for the D2D connection, security information, a D2D identifier, etc. The connection establishment type indicates a 2-step D2D connection establishment procedure. The information of each device indicates information of devices to which the D2D connection establishment is targeted. The information of each device may be any one of each device's C-RNTI, an STID, etc assigned by the network. The D2D identifier indicates an identifier for the D2D connection to be established by the network. The D2D identifier may be a link level D2D identifier. In IEEE 802.16, the link level D2D identifier may be an STID. In 3GPP LTE-A, the link level D2D identifier may be an RNTI. Alternatively, the D2D identifier may be a connection/flow level D2D identifier. In IEEE 802.16, the connection/flow level D2D identifier may be a flow ID or connection ID in an MAC layer. In 3GPP LTE-A, the connection/flow level D2D identifier may be an LCID in an MAC layer or a DRB identity in an RLC layer.

In step S420, the device 1 transmits a connection establishment response message to the network. The connection establishment response message indicates whether to accept or deny a D2D connection establishment request of the network. The embodiment of FIG. 6 shows a case in which the device 1 accepts the D2D connection establishment request of the network.

In step S430, the devices 1 and 2 perform a resource request and allocation procedure for data transmission of the device 2. The D2D identifier transmitted through the connection establishment request message may be used in resource allocation. If the resource allocation is complete between the device 1 and the device 2, the device 1 and the device 2 receive traffic data in step S440.

Figure 7:
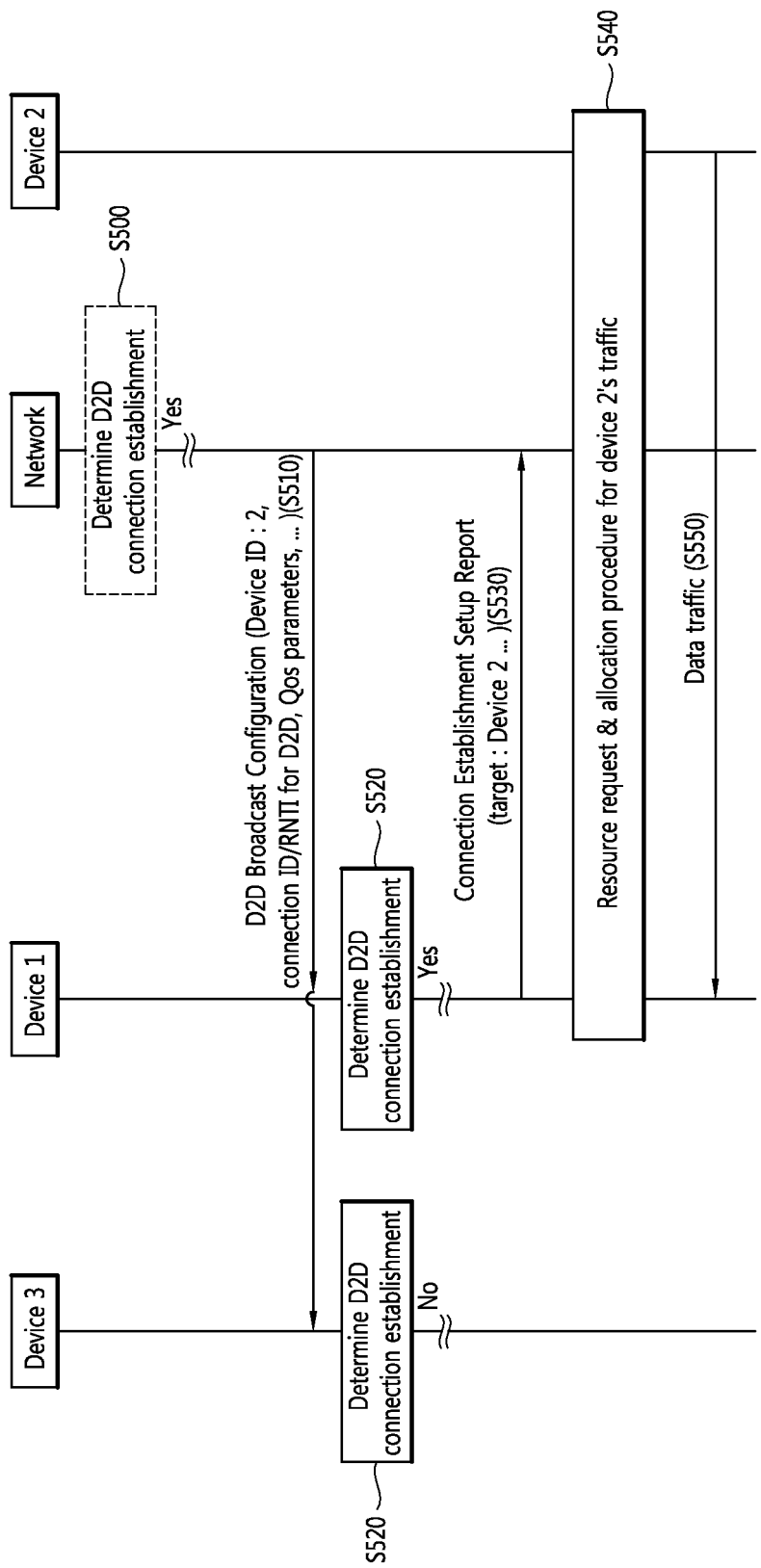
FIG. 7 shows another example of a D2D connection establishment method according to an embodiment of the present invention.

FIG. 7 shows another example of a D2D connection establishment method according to an embodiment of the present invention. The embodiment of FIG. 7 shows a case in which, when a D2D connection establishment is initiated by a network, the D2D connection establishment procedure is achieved in two steps. A D2D connection can be established between a device 1 and a device 2 in a state where the device 2 has already transmitted data to many random devices in a neighbor area. That is, the device 2 is in a state where a D2D connection has already been established to the many random devices.

Referring to FIG. 7, the network determines whether a D2D connection is established between devices in step S500. The network can determine whether the D2D connection is established between the devices on the basis of a proximity between the devices by the use of location information of the devices, a presence of data to be transmitted and received between the devices, a preference for the D2D connection of the devices, etc. This step can be skipped.

In step S510, the network transmits a D2D broadcast configuration message. The D2D broadcast configuration message may be transmitted in a broadcast manner. That is, the D2D broadcast configuration message can be transmitted not only to devices which are considered by the network as target devices to which the D2D connection is established but also to all neighbor devices. The D2D broadcast configuration message may include information on a source device to which a D2D connection is established, information on a D2D connection pre-established for traffic of the device 2, a QoS parameter for the D2D connection, security information, a D2D identifier, etc. The information on the source device may be any one of identifiers such as each device's C-RNTI, an STID, etc assigned by the network. The D2D identifier indicates an identifier of the D2D connection to be established by the network. The D2D identifier may be a link level D2D identifier. In IEEE 802.16, the link level D2D identifier may be an STID. In 3GPP LTE-A, the link level D2D identifier may be an RNTI. Alternatively, the D2D identifier may be a connection/flow level D2D identifier. In IEEE 802.16, the connection/flow level D2D identifier may be a flow ID or connection ID in an MAC layer. In 3GPP LTE-A, the connection/flow level D2D identifier may be an LCID in an MAC layer or a DRB identity in an RLC layer.

Upon receiving D2D broadcast configuration information, the device 1 and a device 3 determine whether to establish a D2D connection in step S520. The device 1 and the device 3 can determine whether to establish the D2D connection on the basis of information included in the received D2D broadcast configuration information. The device 1 and the device 3 can determine whether to establish the D2D connection between devices on the basis of a proximity to the device 2 by the use of location information of the device 2, a presence of data to be transmitted and received with respect to the device 2, its preference for a D2D connection, etc. It is assumed in the example of FIG. 7 that the device 1 accepts the D2D connection establishment, and the device 3 rejects the D2D connection establishment.

In step S530, upon accepting the D2D connection establishment, the device 1 transmits a connection establishment setup report message to the network. The connection establishment setup report message indicates information on devices for which the D2D connection is established. The connection establishment setup report message can indicate that a target device of the D2D connection is the device 2.

In step S540, the device 1 and the device 2 perform a resource request and allocation procedure for data transmission of the device 2. A D2D identifier transmitted by using the connection establishment request message can be used in a resource allocation. If the resource allocation is complete between the device 1 and the device 2, the device 1 receives data traffic from the device 2 in step S550.

Hereinafter, a case in which a D2D connection establishment procedure is initiated by a device will be described. If the device initiates the D2D connection establishment, the device can request a network to perform the D2D connection establishment by determining a proximity to a communication target device determined on the basis of neighbor devices' profiles acquired through a neighbor discovery procedure, a presence of data to be transmitted and received with respect to the target device, a preference for the D2D connection establishment, etc.

Figure 8:
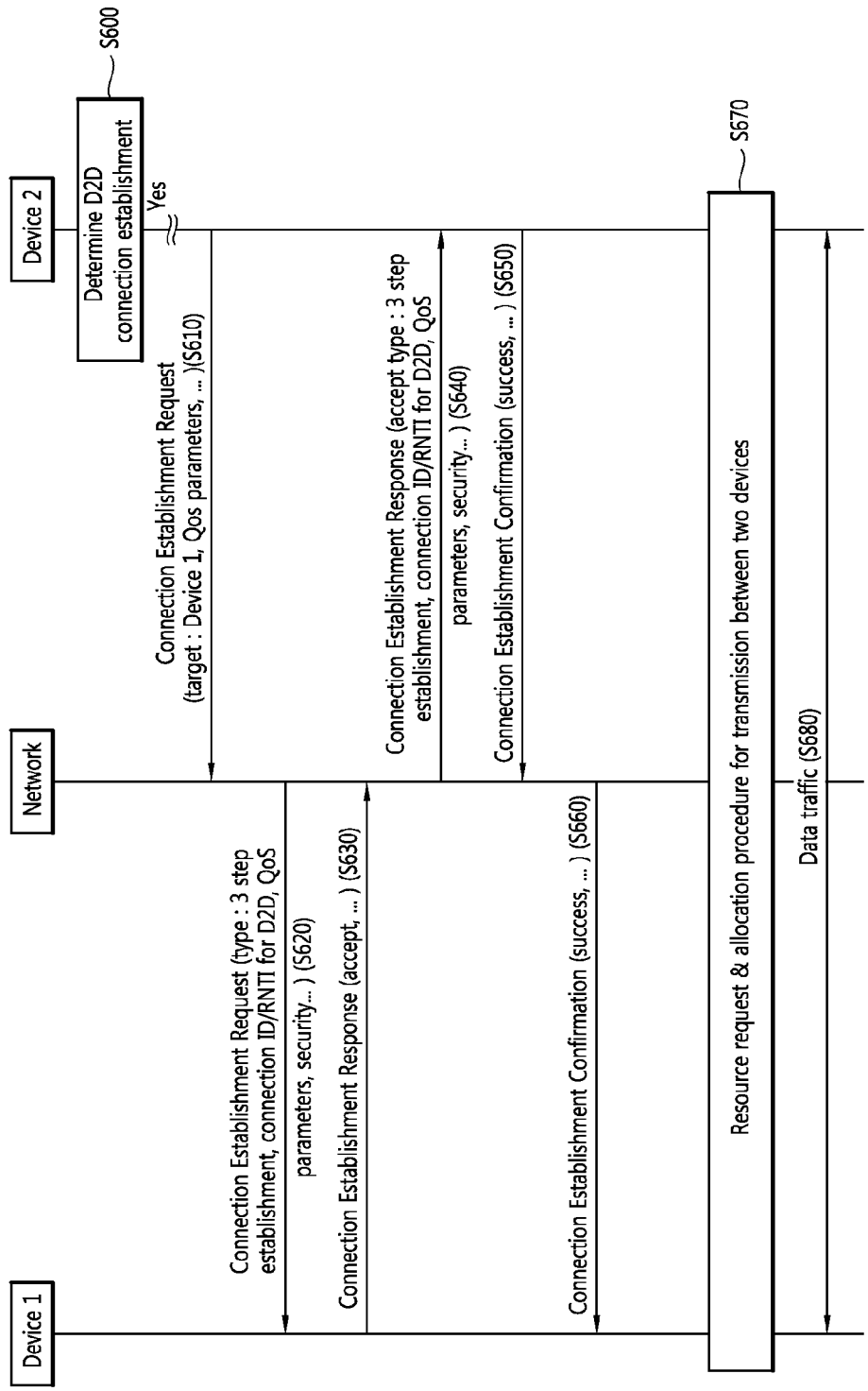
FIG. 8 shows another example of a D2D connection establishment method according to an embodiment of the present invention.

FIG. 8 shows another example of a D2D connection establishment method according to an embodiment of the present invention. The embodiment of FIG. 8 shows a case in which, when a D2D connection establishment is initiated by a device, the D2D connection establishment procedure is achieved in three steps.

Referring to FIG. 8, a device 2 determines whether to establish a D2D connection in step S600. The device 2 can request a network to perform the D2D connection establishment by determining a proximity to a communication target device determined on the basis of neighbor devices' profiles acquired through a neighbor discovery procedure, a presence of data to be transmitted and received with respect to the target device, a preference for the D2D connection establishment, etc. It is assumed in the embodiment of FIG. 8 that the target device is a device 1.

In step S610, the device 2 transmits a first connection establishment request message to the network. The first connection establishment request message may include information on the target device to which a D2D connection is established and a QoS parameter for the D2D connection. The QoS parameter for the D2D connection indicates QoS information requested for the D2D connection by the device 2.

Upon receiving the first connection establishment request message, the network transmits a second connection establishment request message to the device 1 which is the target device of the D2D connection in step S620. The second connection establishment request message may include a connection establishment type for indicating a D2D connection establishment procedure consisting of 3 steps, information of the device 2, a QoS parameter for the D2D connection, security information, a D2D identifier, etc. In step S630, the device 1 transmits a first connection establishment response message to the network. The connection establishment response message indicates an acceptance or rejection on a D2D connection establishment request of the device 2. The embodiment of FIG. 8 shows a case in which the device 1 accepts the D2D connection establishment request of the device 2.

Upon receiving the first connection establishment response message, the network transmits a second connection establishment response message to the device 2 in step S640. The second connection establishment response message may include an acceptance or rejection on the D2D connection establishment request of the device 1, a connection establishment type for indicating a D2D connection establishment procedure consisting of 3 steps, a QoS parameter for the D2D connection, security information, a D2D identifier, etc. The QoS parameter for the D2D connection may be included when QoS information requested for the D2D connection by the network is preferential over QoS information requested by the device 2.

Upon receiving the second connection establishment response message, the device 2 transmits a first connection establishment confirmation message to the network in step S650. The first connection establishment confirmation message indicates whether a D2D connection establishment is finally successful according to the acceptance or rejection on the D2D connection establishment request of the device 1. Since the device 1 accepts the D2D connection establishment request in the embodiment of FIG. 8, the connection establishment confirmation message indicates the success of the D2D connection establishment. Upon receiving the first connection establishment confirmation message, the network transmits a second connection establishment confirmation message to the device 1 in step S660. The second connection establishment confirmation message also indicates the success of the D2D connection establishment.

In step S670, the device 1 and the device 2 perform a resource request and allocation procedure for data transmission. A D2D identifier transmitted by using the connection establishment request message can be used in a resource allocation. In the resource allocation is complete between the device 1 and the device 2, the device 1 and the device 2 transmit and receive data traffic in step S680.

Figure 9:
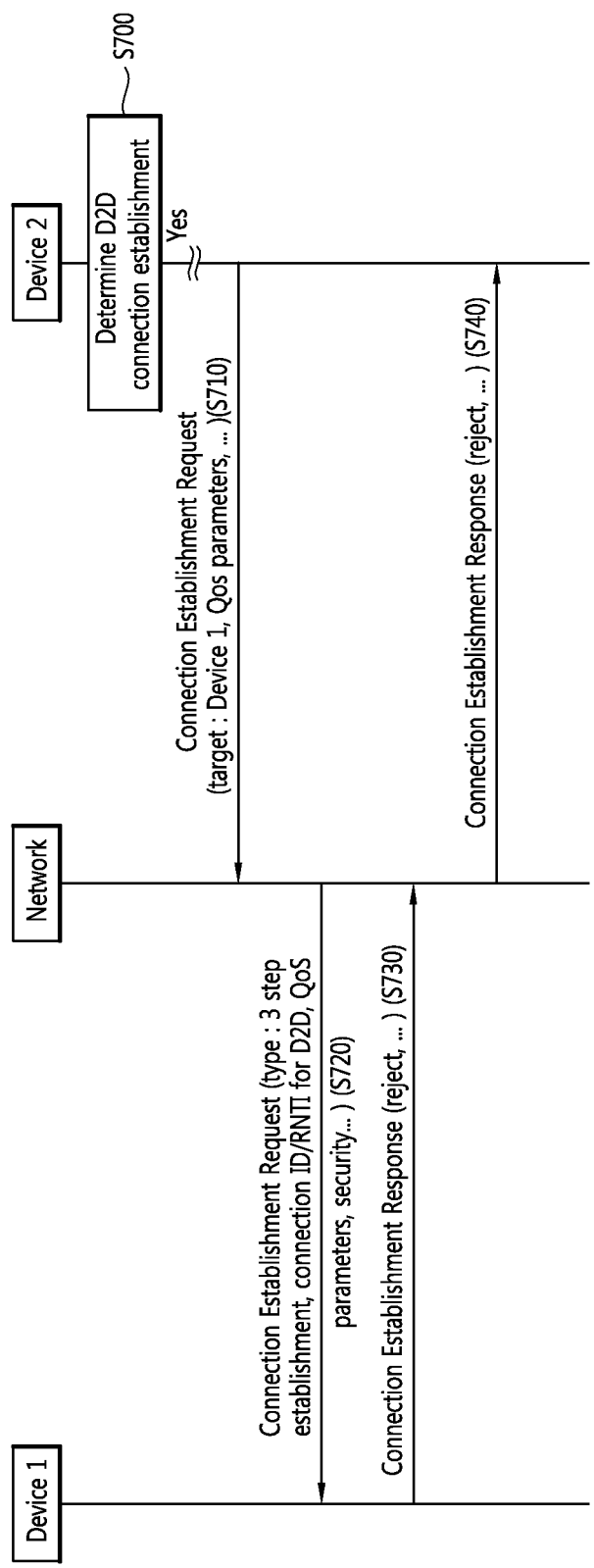
FIG. 9 shows another example of a D2D connection establishment method according to an embodiment of the present invention.

FIG. 9 shows another example of a D2D connection establishment method according to an embodiment of the present invention. The embodiment of FIG. 9 shows a case in which, when a D2D connection establishment is initiated by a device, the D2D connection establishment procedure is achieved in three steps.

Referring to FIG. 9, a device 2 determines whether to establish a D2D connection in step S700. The device 2 can request a network to perform the D2D connection establishment by determining a proximity to a communication target device determined on the basis of neighbor devices' profiles acquired through a neighbor discovery procedure, a presence of data to be transmitted and received with respect to the target device, a preference of the D2D connection establishment, etc. It is assumed in the embodiment of FIG. 9 that the target device is a device 1.

In step S710, the device 2 transmits a first connection establishment request message to the network. The first connection establishment request message may include information on the target device to which a D2D connection is established and a QoS parameter for the D2D connection. The QoS parameter for the D2D connection indicates QoS information requested for the D2D connection by the device 2.

Upon receiving the first connection establishment request message, the network transmits a second connection establishment request message to the device 1 which is the target device of the D2D connection in step S720. The second connection establishment request message may include a connection establishment type for indicating a D2D connection establishment procedure consisting of 3 steps, information of the device 2, a QoS parameter for the D2D connection, security information, a D2D identifier, etc. In step S730, the device 1 transmits a first connection establishment response message to the network. The connection establishment response message indicates an acceptance or rejection on a D2D connection establishment request of the device 2. The embodiment of FIG. 9 shows a case in which the device 1 rejects the D2D connection establishment request of the device 2.

Upon receiving the first connection establishment response message, the network transmits a second connection establishment response message to the device 2 in step S740. The second connection establishment response message indicates that the device 1 rejects the D2D connection establishment request of the device 1. Although it is exemplified in the embodiment of FIG. 9 that the device 1 rejects the D2D connection establishment request, the D2D connection establishment request may be rejected by the network. In this case, instead of transmitting the first request connection establishment message to the device 1, the network may directly indicate to the device 2 that the network rejects the D2D connection establishment request by using the first connection establishment response message.

The network can allocate an uplink resource while transmitting the first/second connection establishment response message. That is, since the D2D connection establishment request of the device 2 is rejected, a network-based data transmission mechanism can be used again. Information on an uplink resource such as a resource allocation time or the like can be transmitted by using the first/second connection establishment response message. The device 2 can use the allocated uplink resource to request the uplink resource to the network or can transmit data, which is to be transmitted to the device 1, to the network.

Meanwhile, an additional D2D connection can be established between devices of which the D2D connection has already existed. For example, the additional D2D connection can be established between the devices when a QoS property is different from that of the existing D2D connection. In this case, information of each device for the additional D2D connection establishment may have already been acquired by the aforementioned D2D connection establishment procedure. Therefore, if information and/or parameters of each device for additional D2D connection establishment is set to the same as information and/or parameters of each device for the existing D2D connection establishment, messages and/or parameters included in the messages according to the embodiment of the present invention described above can be partially omitted.

Figure 10:
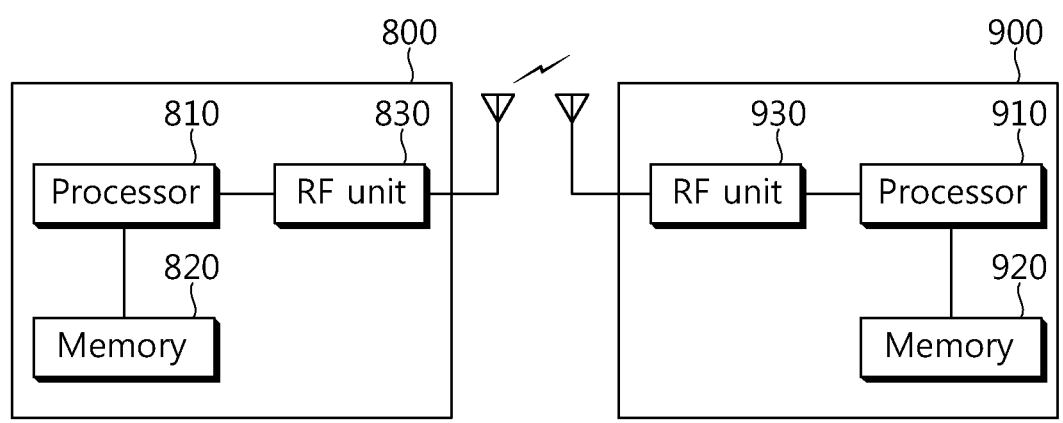
FIG. 10 is a block diagram showing wireless communication system to implement an embodiment of the present invention.

FIG. 10 is a block diagram showing wireless communication system to implement an embodiment of the present invention.

A base station 800 includes a processor 810, a memory 820, and an RF (radio frequency) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A device 900 includes a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for establishing, by a first device, a device-to-device (D2D) connection with a second device in a wireless communication system, the method comprising:
   receiving a D2D broadcast configuration message including information on the second device, from a network;
   determining whether to establish the D2D connection with the second device or not, based on at least one of a proximity between the first device and the second device, a presence of data to be transmitted between the first device and the second device, and a preference for the D2D connection of the first device; and
   transmitting a connection establishment setup report message including information on the second device to the network, if it is determined to establish the D2D connection with the second device,
   wherein the D2D broadcast configuration message further includes a D2D identifier, and
   wherein the D2D identifier is a link level D2D identifier allocated to a physical link between the first device and the second device.

2. The method of claim 1, wherein the D2D broadcast configuration message is broadcast.

3. The method of claim 1, wherein the information on the second device includes an identifier of the second device.

4. The method of claim 3, wherein the identifier of the second device is one of a cell radio network temporary identifier (C-RNTI) or a station identifier (STID).

5. The method of claim 1, wherein the D2D identifier is a connection/flow level D2D identifier allocated to a logical link between the first device and the second device.

6. The method of claim 1, further comprising:
   allocating resources for transmission of data to the second device; and
   transmitting the data to the second device.

7. The method of claim 1, further comprising performing a neighbor discovery procedure.

8. The method of claim 1, wherein the D2D broadcast configuration message further includes at least one of D2D connection information pre-established for the second device, a quality of service (QoS) parameter for the D2D connection, or security information.

9. A method for establishing, by a first device, a device-to-device (D2D) connection with a second device in a wireless communication system, the method comprising:
   determining whether to establish the D2D connection with the second device or not, based on at least one of a proximity between the first device and the second device based on a profile of the second device obtained through a neighbor discovery procedure, a presence of data to be transmitted to the second device, and a preference for the D2D connection of the first device;
   transmitting a connection establishment request message to request of the D2D connection establishment to a network if it is determined to establish the D2D connection with the second device, the connection establishment request message including information on the second device and a quality of service (QoS) parameter for the D2D connection;
   receiving a connection establishment response message indicating whether the request of the D2D connection establishment is accepted or rejected, from the network; and
   receiving an uplink resource if the connection establishment response message indicates that the request of the D2D connection establishment is rejected by the network or the second device.

10. The method of claim 9, wherein the D2D connection response message includes at least one of a connection establishment type, a QoS parameter for the D2D connection, security information, and a D2D identifier, if the connection establishment response message indicates that the request of the D2D connection establishment is accepted.

11. The method of claim 10, wherein the connection establishment type indicates a 3-step D2D connection establishment procedure.

12. The method of claim 9, further comprising transmitting a connection establishment confirm message to confirm the D2D connection establishment to the network.

13. A device configured to establish a device-to-device (D2D) connection with a second device in a wireless communication system, the device comprising:
   a transceiver; and
   a processor operatively connected to the transceiver and configured to:
      receive a D2D broadcast configuration message including information on the second device, from a network;
      determine whether to establish the D2D connection with the second device or not, based on at least one of a proximity between the device and the second device, a presence of data to be transmitted between the device and the second device, and a preference for the D2D connection of the device; and
      transmit a connection establishment setup report message including information on the second device to the network, if it is determined to establish the D2D connection with the second device,
      wherein the D2D broadcast configuration message further includes a D2D identifier, and
      wherein the D2D identifier is a link level D2D identifier allocated to a physical link between the device and the second device.

14. A device configured to establish a device-to-device (D2D) connection with a second device in a wireless communication system, the device comprising:

a transceiver; and a processor operatively connected to the transceiver and configured to:

determine whether to establish the D2D connection with the second device or not, based on at least one of a proximity between the device and the second device based on a profile of the second device obtained through a neighbor discovery procedure, a presence of data to be transmitted to the second device, and a preference for the D2D connection of the device;

transmit a connection establishment request message to request of the D2D connection establishment to a network if it is determined to establish the D2D connection with the second device, the connection establishment request message including information on the second device and a quality of service (QoS) parameter for the D2D connection;

receive a connection establishment response message indicating whether the request of the D2D connection establishment is accepted or rejected, from the network; and receive an uplink resource if the connection establishment response message indicates that the request of the D2D connection establishment is rejected by the network or the second device.

* * * * *